United States Patent
Constantinof (10) Patent No.: US 7,590,122 B2
(45) Date of Patent: Sep. 15, 2009

(54) METHOD AND APPARATUS FOR SESSION CONTROL

(75) Inventor: Cristian Constantinof, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1187 days.

(21) Appl. No.: 10/439,531

(22) Filed: May 16, 2003

(65) Prior Publication Data

US 2004/0228352 A1 Nov. 18, 2004

(51) Int. Cl.
*H04L 12/28* (2006.01)
(52) U.S. Cl. .................. 370/395.21; 370/352; 370/431; 709/219; 709/227; 709/229; 709/231; 713/155; 714/39
(58) Field of Classification Search .................. 370/338, 370/352, 242, 395.21, 431; 717/100; 709/247, 709/231, 219, 227, 229; 704/231, 247; 713/155, 713/201; 714/39
See application file for complete search history.

(56) References Cited

U.S. PATENT DOCUMENTS

| | | | | |
|---|---|---|---|---|
| 5,572,442 A * | 11/1996 | Schulhof et al. | ............ | 709/219 |
| 5,987,331 A | 11/1999 | Grube et al. | | |
| 6,119,143 A | 9/2000 | Dias et al. | | |
| 6,182,149 B1 * | 1/2001 | Nessett et al. | ................ | 709/247 |
| 6,219,346 B1 * | 4/2001 | Maxemchuk | ................ | 370/338 |
| 6,256,771 B1 * | 7/2001 | O'Neil et al. | ................ | 717/100 |
| 6,314,409 B2 * | 11/2001 | Schneck et al. | ................ | 705/54 |
| 6,370,234 B1 | 4/2002 | Kroll | | |
| 6,490,624 B1 * | 12/2002 | Sampson et al. | ............ | 709/227 |
| 6,775,534 B2 | 8/2004 | Lindgren et al. | | |
| 6,801,948 B2 * | 10/2004 | Clark et al. | ................ | 709/231 |
| 6,868,450 B1 * | 3/2005 | Lucovsky | ................... | 709/229 |
| 6,885,874 B2 | 4/2005 | Grube et al. | | |
| 6,904,521 B1 * | 6/2005 | Jivsov | ........................ | 713/155 |
| 6,944,133 B2 * | 9/2005 | Wisner et al. | ................ | 370/242 |

(Continued)

FOREIGN PATENT DOCUMENTS

EP 0841825 A2 5/1998

(Continued)

OTHER PUBLICATIONS

European Search Report for EP 04291218.8 mailed Sep. 28, 2004.

(Continued)

*Primary Examiner*—Gerald Gauthier
(74) *Attorney, Agent, or Firm*—Withrow & Terranova, P.L.L.C.

(57) ABSTRACT

The present invention provides a session filter associated with an element to be protected in a communication network. Session requests intended for the protected element are processed by the session filter prior to being forwarded to the protected element. The protected element or a device associated therewith will provide event information indicative of undesirable session conditions, such as an overload condition, which necessitates a reduction or stoppage of incoming session requests for the protected element. The session filter will directly or indirectly receive the event information and take steps to reduce or stop the session requests being sent to the protected element. The session filter may filter the incoming session requests for the protected element and selectively send select session requests to the protected element, as well as send system protection responses to minimize the number of new session requests to devices generating or forwarding the incoming session requests.

40 Claims, 6 Drawing Sheets

U.S. PATENT DOCUMENTS

| | | | |
|---|---|---|---|
| 6,944,150 B1* | 9/2005 | McConnell et al. | 370/352 |
| 7,171,678 B2* | 1/2007 | Buehl et al. | 725/87 |
| 7,342,918 B2* | 3/2008 | Keenan et al. | 370/352 |
| 2001/0025316 A1* | 9/2001 | Oh | 709/231 |
| 2002/0049930 A1* | 4/2002 | Hannigan | 714/39 |
| 2002/0052962 A1 | 5/2002 | Cherkasova et al. | 709/229 |
| 2002/0078383 A1* | 6/2002 | Leerssen et al. | 713/201 |
| 2003/0016676 A1* | 1/2003 | Allen et al. | 370/395.52 |
| 2003/0140145 A1* | 7/2003 | Lindberg et al. | 709/227 |
| 2004/0190522 A1 | 9/2004 | Aerrabotu et al. | |
| 2007/0121590 A1 | 5/2007 | Turner et al. | |

FOREIGN PATENT DOCUMENTS

WO    WO 01/86972 A2    11/2001

OTHER PUBLICATIONS

Office action from U.S. Appl. No. 10/606,687 mailed Sep. 26, 2007.

* cited by examiner

METHOD AND APPARATUS FOR SESSION CONTROL

FIELD OF THE INVENTION

The present invention relates to communications, and in particular to providing session control in association with communication networks.

BACKGROUND OF THE INVENTION

The volume of calls in a telephony network significantly varies over time, and traditionally, such networks have been engineered to support peak traffic levels associated with social or business calling patterns. There are, however, certain events that will generate traffic patterns that exceed the supported peak levels. Examples of such events include mass calling events triggered by promotional or advertising campaigns, catastrophic events including natural disasters and acts of war, and denial of service attacks in packet-based networks. Further, equipment failures, such as telephony switch malfunctions, may also lead to situations where call volumes exceed network capacity. Left unchecked, such situations may disable network equipment and significantly impact the throughput of the entire network.

The role of network session controls is to localize the effect of unexpectedly high traffic levels or malicious session requests, and to maintain the agreed service levels for subscribers. While individual telephony switches in a circuit-switched network may implement nodal session control mechanisms, the network session controls help to isolate the source of undesired session requests and minimize the impact on other calls. Traditionally, network call or session controls for overload situations have been addressed in circuit-switched networks using two mechanisms intended to throttle or otherwise reduce the call volume arriving at a given switch. The first mechanism incorporates trunk group management, which dynamically reduces the number of trunks available between switches during overload situations. The second mechanism provides screening in service transfer points (STPs) in the call signaling network to effectively filter call setup requests based on point codes, calling number, called number, and the like.

Unfortunately, neither of the mechanisms used in the circuit-switched network are available for packet networks, since packet-based soft switches do not have the concept of trunk groups, and there are no STPs. Due to their open nature, packet networks are more vulnerable to malicious attacks executed under the guise of session initiation or establishment. The only session or overload control solutions for packet networks include discarding incoming messages or responding to session request messages with a message indicating that service is unavailable. In the former case, discarding incoming messages affects not only new session initiation attempts, but also sessions that are already established. Responding to session request messages with service unavailable messages requires additional processing from the overloaded element, and doesn't provide any remedial actions to other nodes or elements in the network. Accordingly, there is a need to develop a protection mechanism that allows service providers to limit or prevent certain session requests from being propagated throughout a packet network in an efficient manner.

SUMMARY OF THE INVENTION

The present invention provides a session filter associated with an element, or group of elements, to be protected in a communication network. Session requests intended for the protected element are processed by the session filter prior to being forwarded to the protected element. The protected element or a device associated therewith, or a human operator, will provide event information indicative of undesirable session conditions, such as an overload condition, which necessitates a reduction or stoppage of incoming session requests for the protected element. The session filter will directly or indirectly receive the event information and take steps to reduce or stop the session requests being sent to the protected element; The session filter may filter the incoming session requests for the protected element and selectively send select session requests to the protected element, as well as send system protection responses to devices generating or forwarding the incoming session requests. The event information will provide instructions to reduce, filter, or stop initiation and forwarding of session requests. Accordingly, upon receiving event information, the session filter can take the appropriate action to minimize the number of incoming session requests for a protected element or group thereof to minimize the undesirable session condition or eliminate it altogether.

The session filter can use various criteria, including information provided in the event information, to determine how to filter session requests or respond to them with the system protection messages. The filtering of the session requests may result in reducing the number of session requests to a certain level, reducing them by a certain percentage, as well as controlling the session requests to ensure that only a select number of sessions is established to a given protected element.

The session filter preferably operates in part over a packet network, and more preferably in a Session Initiation Protocol (SIP) network, wherein the session requests are INVITE messages or the system protection messages are some form of SIP message. Further, the session filter may act as a call signaling liaison between the call signaling network of a circuit-switched network and a packet network. For example, the session filter may be placed between the public switched telephone network (PSTN) and a SIP network, wherein session requests for the PSTN are call setup messages, such as Integrated Services User Protocol (ISUP) Initial Address Messages (IAMs) and system protection messages for the circuit-switched network are ISUP Overload messages.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
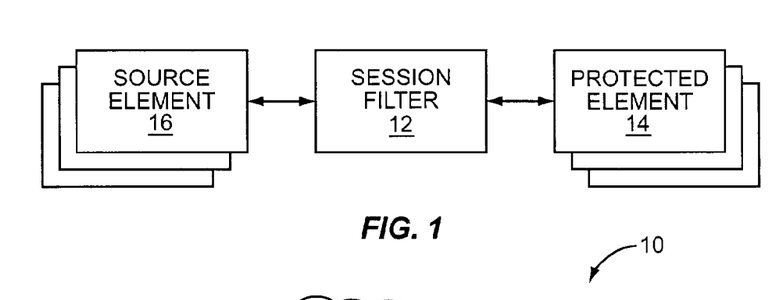
FIG. 1 is a block representation of a network incorporating a session filter according to a first embodiment of the present invention.

With reference to FIG. 1, a communication environment 10 is illustrated wherein a session filter 12 is capable of processing incoming session requests intended for protected elements 14 and sent from source elements 16. The session requests are those requests intended to initiate a communication session between a protected element 14 and a source element 16. All other session messages, especially those after a session is established, do not need to be processed by the session filter 12. Notably, various types of networks may be used to connect the source element 16, session filter 12, and protected element 14.

Accordingly, the session filter 12 acts as a proxy for session legs established with the protected element 14. The protected element 14 may be informed of the existence of the session filter 12 through provisioning or dynamically by the session filter 12 or other network entity. In operation, the protected element 14 may be capable of providing event information directly or indirectly to the session filter 12. The event information will identify an overload condition or other undesired session condition indicative of the need for the session filter 12 to protect the protected element 14 from all or select session requests. Upon receiving the event information, the session filter 12 will apply session processing rules to determine how to respond to all or select incoming session requests. The processing rules will cause the session filter 12 to apply the selection criteria to the incoming session requests and to filter the requests based on those criteria. Following the rules, the session filter 12 may provide system protection responses in response to session requests that are not forwarded to the protected element(s). For example, the session filter 12 may filter the incoming requests to reduce the number of session requests sent to a protected element 14 to a desired level, reduce the number of session requests provided to the protected element 14 by a certain percentage, or limit the number of simultaneous sessions with a particular protected element 14.

When the processing rules are applied to select session requests, selection indicia identified within the event information by the protected element 14 or provided by the session filter 12 may be used to identify the session request to be rejected. The selection criteria may include indicia indicative of the identity of the source element 16 or the protected element 14, such as a universal resource identifier in the offending session request, the type of session, and the like.

The event information provided to the session filter 12 by the protected element 14 may simply be information indicative of an overload or other undesired condition, or may actually provide numerous parameters describing the offending condition, selecting certain processing rules, providing selection indicia for identifying the session request to process, specifying filtering techniques to apply to the session request, identifying system protection responses, or any combination thereof. As such, the sophistication of the event information provided by the protected element 14 may vary, and the session filter 12 and the protected element 14 will be configured appropriately to cooperate with one another and effectively process incoming session requests in light of the event information provided by the protected element 14. Further, the event information may be provided by a network operator or a device that is capable of identifying an overload or other undesirable condition influencing the protected element 14.

In operation, the session filter 12 will receive event information and determine the appropriate processing rules to apply to all or select ones of the subsequent session requests. The session filter 12 may apply back pressure to the appropriate session request by sending the system protection responses to the source elements 16 that sent the session requests, or to another network element. The system protection messages are configured to reduce or stop the sending of session requests for a defined amount of time or indefinitely. As such, the offending source elements 16 or other network elements will stop sending session requests and help alleviate the undesirable session condition afflicting the protected element 14. The session filter 12 will preferably apply various filtering criteria to the incoming session requests. The filtering criteria may have the session filter 12 simply ignore all or select session requests, wherein those session requests that are ignored are not forwarded to the protected element 14. The filtering may be based on the number of attempts, the overall number of session requests, the source element 16, and the like. By responding to event information from a protected element 14 in this manner, the session filter 12 can act on behalf of the protected element 14 to assist in the alleviation of the undesirable session conditions.

In a preferred embodiment, at least a portion of the communication sessions established between the protected element 14 and the source element 16 are facilitated using the Session Initiation Protocol (SIP). The specification for SIP is provided in the Internet Engineering Task Force's Request for Comments (RFC) 3261: Session Initiation Protocol Internet Draft, which is incorporated herein by reference in its entirety. In general, SIP is used to establish media sessions between any number of endpoints, such as the source and protected elements 16, 14. Typically, these endpoints may support any number or combination of data, audio, and voice media sessions, depending on the configuration of the device. A SIP endpoint is capable of running an application, typically referred to as a user agent (UA), which is capable of facilitating media sessions using SIP. In certain embodiment, user agents may register their ability to establish sessions with a SIP proxy by sending REGISTER messages to the SIP proxy, such as that provided by the session filter 12. The REGISTER message informs the SIP proxy of the SIP universal resource locator (URL) that identifies the user agent to the SIP network. The REGISTER message also contains information about how to reach specific user agents over the SIP network, typically by providing the Internet Protocol (IP) address and port that the user agent will use for SIP sessions. When a user agent wants to establish a session with another user agent, the user agent initiating the session may send an INVITE message to the SIP proxy and specify the target user agent in the TO header of the INVITE message. Identification of the user agent takes the form of a SIP URL. The SIP proxy will use the SIP URL in the TO header of the message to determine if the targeted user agent is registered with the SIP proxy. Generally the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. Media capabilities may be exchanged in other messages, such as the SIP INFO message. Media capabilities are typically described using the Session Description Protocol (SDP). Once respective endpoints are in an active session with each other and have determined each other's capabilities, the specified media content may be exchanged during an appropriate media session.

According to the Internet Engineering Task Force's RFC 3261, a user agent is an application that contains both a user agent client and a user agent server. A user agent client generally refers to a client application that initiates SIP requests, wherein a user agent server is an application that contacts the user when a SIP request is received, and returns a response on behalf of the user. Typically, the response accepts, rejects, or redirects the received request.

When implementing SIP, session requests are typically INVITE messages, and the event information may be sent to the session filter 12 using an appropriate SIP message, such as NOTIFY, MESSAGE, and INFO messages. For the event information, a session control header may be defined for the SIP messages to include the appropriate event information as described above. Thus, upon receiving event information, the session filter 12 will apply the necessary session processing rules to INVITE messages meeting the selection criteria. The session filter 12 may send system protection responses in a SIP message back to the source element 16 or other entity, and then provide filtering wherein all, none, or only select ones of the incoming INVITE messages are actually forwarded on to the protected element 14, and are thus allowed to initiate a session with the protected element 14.

Figure 2:
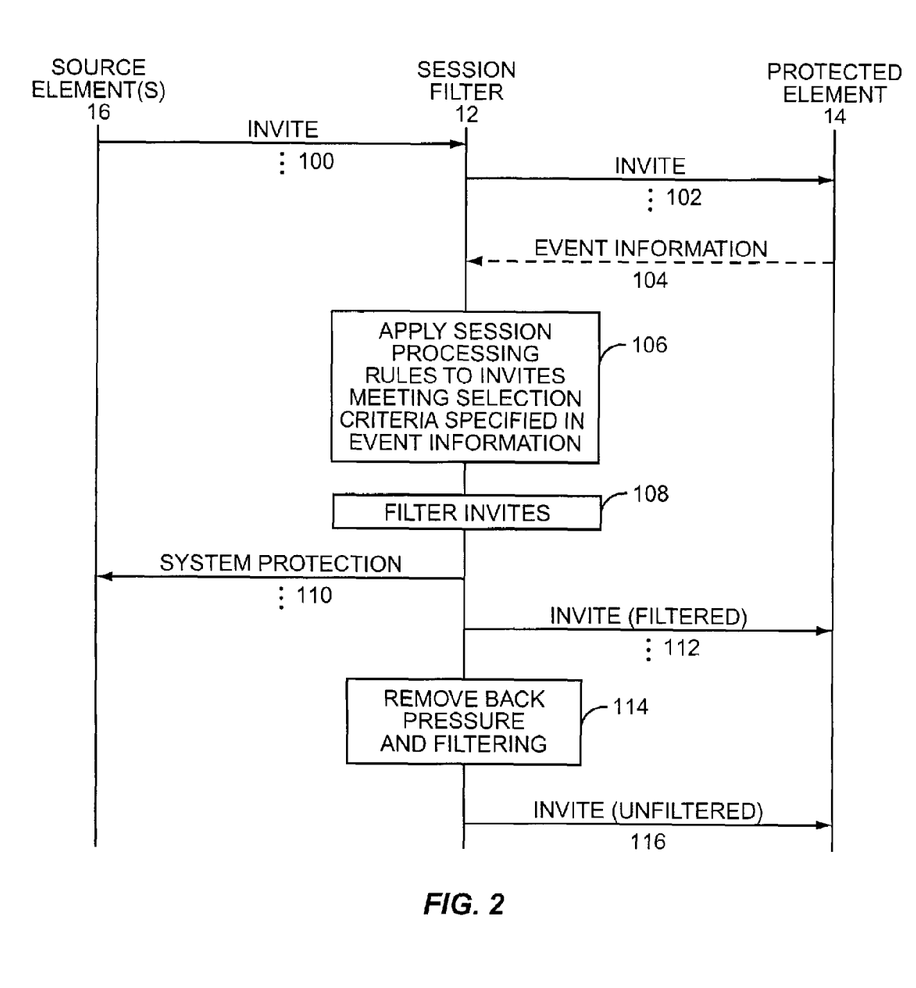
FIG. 2 is a communication flow diagram illustrating operation of the present invention according to the first embodiment.

An exemplary communication flow for a SIP environment according to the embodiment of FIG. 1 is provided in FIG. 2. Initially, one or more source elements 16 will send INVITE messages intended for the protected element 14, wherein the INVITE messages are initially sent to the session filter 12 (step 100). Assuming there is no undesired session condition, such as an overload condition, for the protected element or elements 14, the session filter 12 will forward the INVITE messages to the appropriate protected element 14 (step 102). When an undesired session condition arises at the protected element 14, event information is directly or indirectly sent to the session filter 12 (step 104). Assume that the event information is indicative of an undesired session condition, and is sufficient to cause the session filter 12 to apply session processing rules to INVITE messages meeting selection criteria based on the event information (step 106).

Depending on the configuration of the session processing rules and the event information, the session filter 12 filters the incoming INVITE messages by applying appropriate filtering criteria (step 108), and may respond to all or just the ignored (blocked) INVITE messages with system protection responses (step 110). As such, as the session filter 12 receives additional INVITE messages from the source element 16, only certain of the INVITE messages will be forwarded to the protected element 14 (step 112). Notably, the session filter 12 in certain circumstances may act to effectively block all incoming INVITE messages from being sent to the protected element 14. Accordingly, the session filter 12 effectively applies back pressure to incoming INVITE messages by sending the system protection messages to the source element 16, wherein the system protection messages will trigger the source element 16 to reduce or stop sending the INVITE messages. Further, the INVITE messages that continue to be sent toward the protected element 14 are filtered by the session filter 12 to further control the undesired session condition afflicting the protected element 14.

Based on these responses, the undesired session condition will ultimately be abated, and as such, the session filter 12 may remove the back pressure and filtering after a certain amount of time, or upon receiving information directly or indirectly from the protected element 14 indicating that the undesired session condition is no longer present (step 114). At this point, the session filter 12 will receive the incoming INVITE messages and forward them unfiltered to the protected element 14 (step 116).

Figures 3, 5:
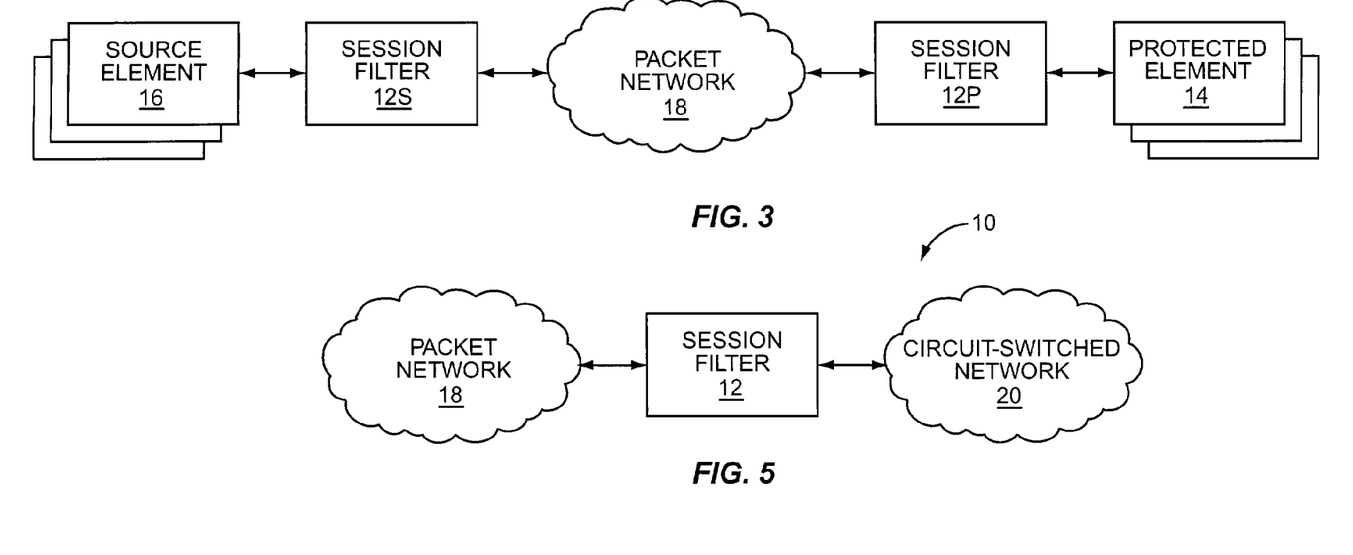
FIG. 3 is a block representation of a network incorporating a session filter according to a second embodiment of the present invention.
FIG. 5 is a block representation of a network incorporating a session filter according to a third embodiment of the present invention.

As noted above, the system protection messages, independent of form or format, may be sent to entities other than the source element 16 to assist in stopping or reducing the number of session requests, such as INVITE messages, intended for the protected element 14. With reference to FIG. 3, a communication environment 10 is illustrated wherein a session filter 12S is provided in association with one or more source elements 16, and a session filter 12P, as described above, is associated with one or more protected elements 14. In this manner, the session filter 12S associated with the source elements 16 may receive system protection messages from the session filter 12P associated with the protected element 14, and act to provide initial filtering for session requests emanating from the source element 16, as well as provide system protection messages to the source element 16 to stop or minimize the origination of session requests intended for one or more protected elements 14. Accordingly, event information sent to session filter 12P for a protected element 14 may be propagated over a packet network 18 to an appropriate session filer 12S associated with source elements 16. Session filter 12S may implement session processing rules in a fashion similar to that described above. An exemplary communication flow for the communication environment 10 as illustrated in FIG. 3 is provided in FIG. 4.

Figure 4:
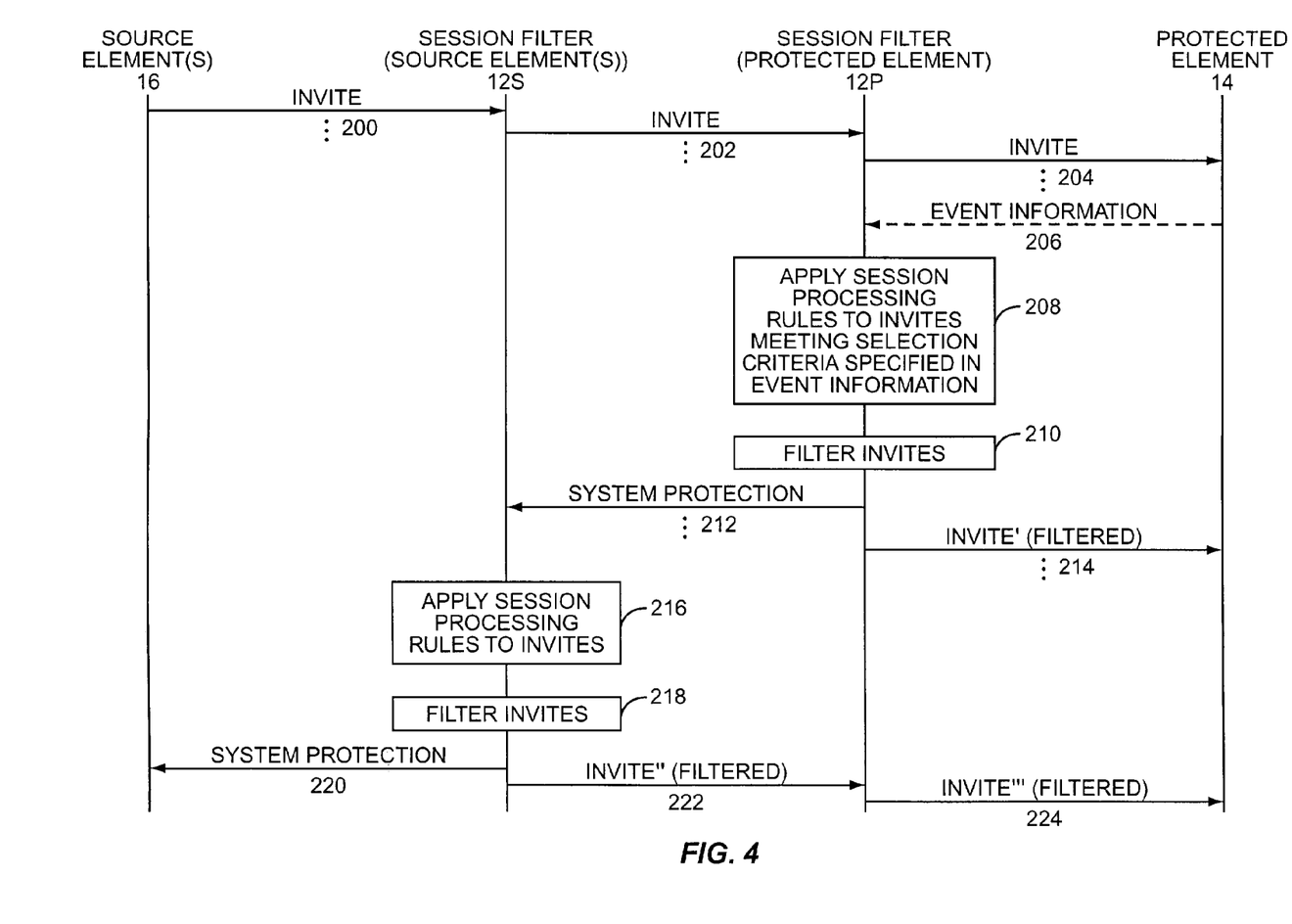
FIG. 4 is a communication flow diagram illustrating operation of the present invention according to the second embodiment.

Initially, one or more source elements 16 will send INVITE messages intended to initiate sessions with one or more protected elements 14. These INVITE messages are received by session filter 12S (step 200), which will forward the INVITE messages to session filter 12P, which is associated with the protected element 14 (step 202). Assuming there are no undesired session conditions, session filter 12P will forward the INVITE messages to the protected element 14 (step 204).

At some point, an undesired session condition will occur with respect to the protected element 14, and event information is sent to session filter 12P (step 206), which will apply session processing rules to INVITE messages meeting the selection criteria based on the event information (step 208). As such, session filter 12P may filter the INVITE messages according to the appropriate filtering criteria (step 210), as well as respond to all or certain of the INVITE messages with system protection messages (step 212). Preferably, the system protection messages are sent to session filter 12S, which is associated with the source element 16.

Based on the system protection message, session filter 12S will apply session processing rules to INVITE messages received from the source element 16 (step 216). The session processing rules may cause session filter 12S to filter the INVITE messages according to desired filter criteria (step 218), as well as send system protection messages to the source element 16 (step 220). Again, the processing at session filter 12S is intended to provide preliminary filtering on INVITE messages, as we as apply preliminary back pressure to further assist the processing at session filter 12P, which is associated with the protected element 14. Accordingly, INVITE messages from the source element 16 are initially filtered by session filter 12S, and the filtered INVITE messages are sent to session filter 12P (step 222), which further filters the INVITE messages and sends the filtered messages to the protected element 14 (step 224). Notably, each of the filtered INVITE messages sent to session filter 12P from session filter 12S may elicit a system protection response from session filter 12P (step not shown).

From the above, the present invention is clearly beneficial for packet-based scenarios wherein the communication sessions are predominantly packet-based between the source element 16 and the protected element 14. Notably, the present invention is also particularly beneficial at the junction of circuit-switched and packet networks. FIG. 5 provides a basic illustration of how a session filter 12 can be provided at the junction of a packet network 18 and a circuit-switched network 20, such as the Public Switched Telephone Network (PSTN). The session filter 12 will reside in the call processing area of the circuit-switched network 20, such as in the Signaling System 7 (SS7) network, yet control circuit-switched connections to a gateway acting as the session interface between the packet network 18 and the circuit-switched network 20. Accordingly, the session filter 12 will reside on a network entity capable of facilitating session requests, such as call setup requests or INVITE messages on the respective networks. Those skilled in the art will recognize the various entities in which a session filter function may be provided. Further, the session filter 12 may be provided in a standalone fashion.

Figure 6:
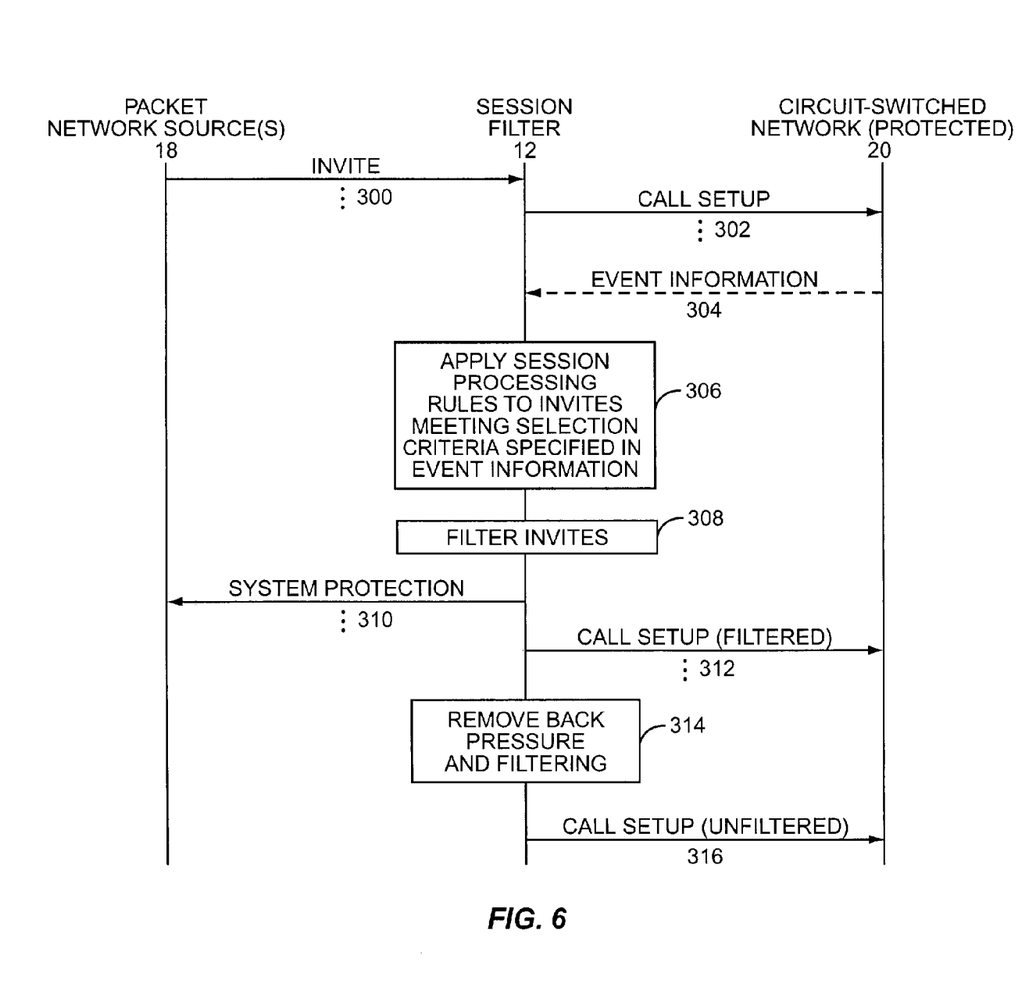
FIG. 6 is a communication flow diagram illustrating operation of the present invention according to the third embodiment.
Figure 7:
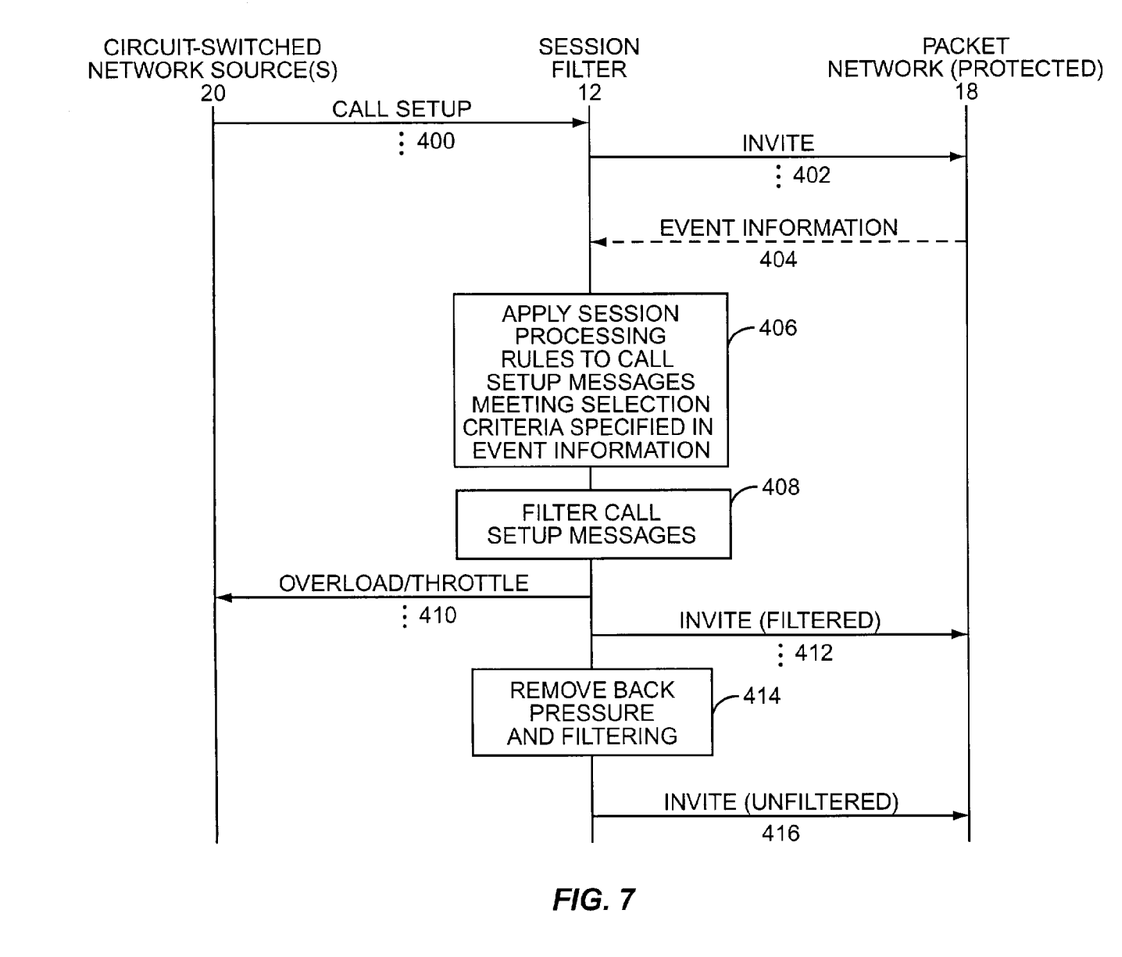
FIG. 7 is a communication flow diagram illustrating operation of the present invention according to a fourth embodiment.

Undesired session conditions may occur on either the packet network 18 or the circuit-switched network 20, and as such, session requests may need filtering and back pressure may need to be provided to either the packet network 18 or the circuit-switched network 20. FIGS. 6 and 7 provide scenarios in which filtering and back pressure is provided for both of these networks.

With particular reference to FIG. 6, session requests in the form of INVITE messages originate from the packet network 18 and undesirable session conditions occur in the circuit-switched network 20. The undesirable session conditions may be a telephony switch failure, trunk failure, or the like. Initially, INVITE messages are generated in the packet network 18 and sent to the session filter 12 (step 300). The session filter 12 will act as a gateway and effectively provide protocol translation from the packet network entities to those of the circuit-switched network 20. Accordingly, a session request in the circuit-switched network 20 may be a call setup message, such as an Integrated Services User Protocol (ISUP) Initial Address Message (IAM), which is sent through the circuit-switched network 20 to the intended protected element 14 (not shown) (step 302). Thus, incoming INVITE messages to the session filter 12 results in call setup messages sent over the circuit-switched network 20.

At some point, an undesirable session condition will occur on the circuit-switched network 20 and appropriate event information will be sent directly or indirectly to the session filter 12 (step 304). The event information could be an ISUP Overload message, or the like. In response to receiving the event information, the session filter 12 will apply session processing rules to the INVITE messages meeting any selection criteria that is available based on the event information (step 306). As such, the session filter 12 may filter the INVITE messages (step 308), as well as respond to the INVITE messages with system protection messages (step 310). Thus, the filtered INVITE messages will result in a reduced number of (filtered) call setup messages being sent over the circuit-switched network 20 (step 312). This process will continue for a select amount of time or until the session filter 12 otherwise determines that the filtering and back pressure is no longer necessary (step 314), wherein the incoming INVITE messages are no longer filtered, and a call setup message is sent over the circuit-switched network 20 for each INVITE message that is received (step 316).

With reference to FIG. 7, the overload or undesirable session conditions occur on the packet network 18, and session requests in the form of call setup messages are originated in the circuit-switched network 20. Thus, call setup messages, such as the ISUP IAMs, are sent to the session filter 12 (step 400), which when no overload or undesirable session conditions exist, will translate the call setup messages into appropriate INVITE messages and send them over the packet network 18 as desired (step 402). When an overload or undesirable session condition occurs, event information is sent to the session filter 12 (step 404) to trigger the application of session processing rules to the call setup messages meeting certain selection criteria (step 406). The session filter 12 will then provide any necessary filtering of the call setup messages (step 408), as well as send system protection messages, such as an overload or a throttle message, to the corresponding telephony switches in the circuit-switched network 20 (step 410). As such, filtered INVITE messages corresponding to those call setup messages that are deemed appropriate to continue are sent over the packet network 18 to the appropriate protected element 14 (step 412). Again, after the overload or undesirable session condition is abated, the session filter 12 will either time out, or in response to an appropriate message, remove the back pressure and filtering provided to the call setup messages (step 414), and allow INVITE messages for each received call setup message to be sent over the packet network 18 (step 416).

Figure 8:
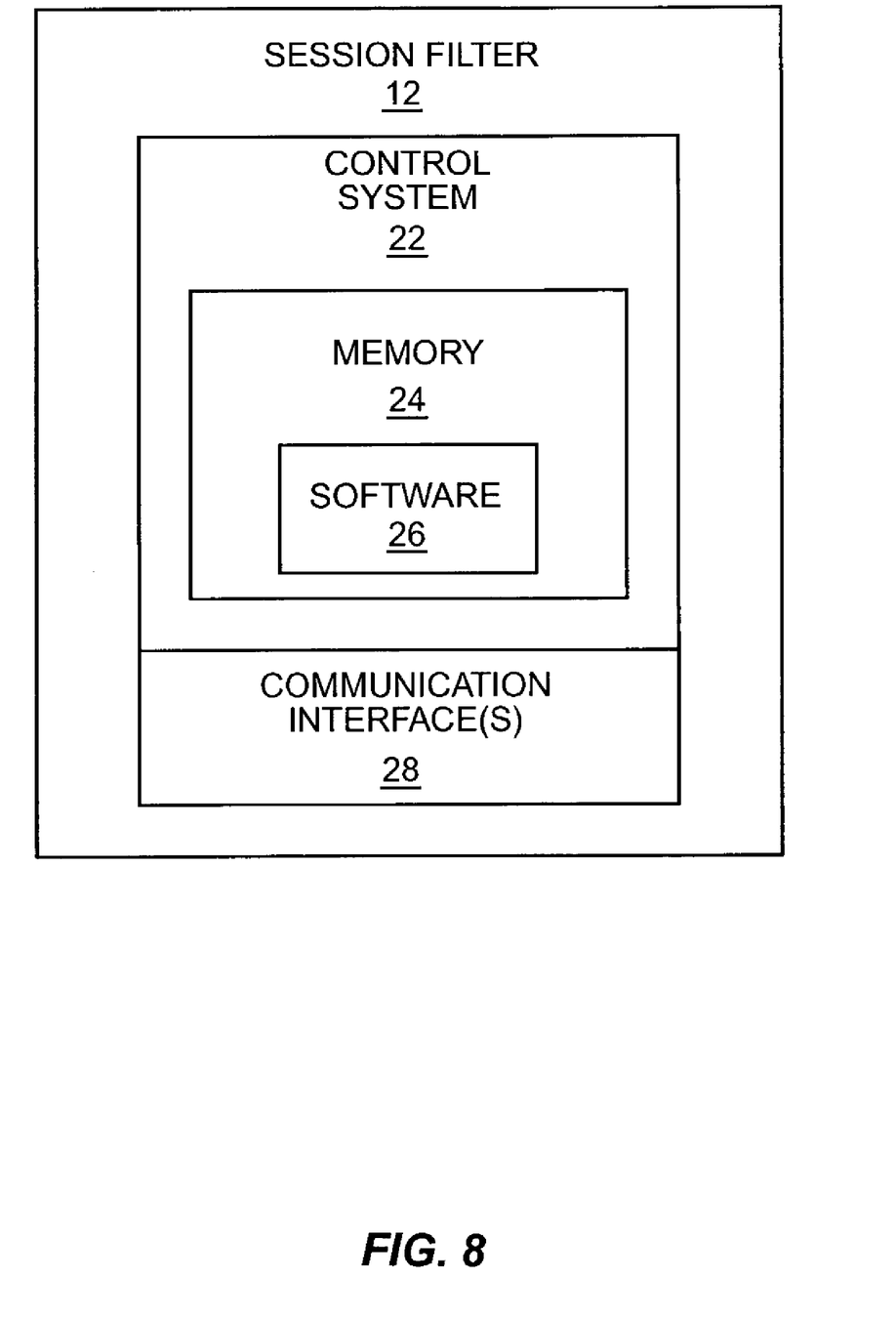
FIG. 8 is a block representation of a session filter constructed according to one embodiment of the present invention.

The functionality of a session filter 12 can be implemented on an isolated server-type device or may be implemented in any number of packet or circuit-switched devices capable of facilitating such functionality. In general, a device implementing a session filter 12 is configured as illustrated in FIG. 8. The session filter 12 will be associated with a control system 22 having sufficient memory 24 for software 26, which is capable of controlling the control system 22 to implement the above-described functionality. The control system 22 is also associated with one or more communication interfaces 28 to facilitate communications with various network entities on either a packet network 18 or circuit-switched network 20, as the configuration dictates.

Those skilled in the art will recognize improvements and modifications to the preferred embodiments of the present invention. All such improvements and modifications are considered within the scope of the concepts disclosed herein and the claims that follow.

What is claimed is:

1. A method of operating a session filter device to provide session control for an element comprising:
   a) receiving session requests for establishing a session between a protected element and at least one source element;
   b) receiving event information indicative of an undesirable condition associated with the protected element;
   c) processing the event information to determine select ones of the session requests to forward to the protected element; and
   d) sending the select session requests to the protected element, wherein incoming session requests are selectively forwarded to the protected element upon receipt of the event information.

2. The method of claim 1 further comprising sending a system protection response configured to stop or reduce a number of the session requests from being generated by the at least one source element.

3. The method of claim 2 wherein the system protection response is sent to the at least one source element.

4. The method of claim 2 wherein the system protection response is sent to a session filter associated with the at least one source element.

5. The method of claim 2 wherein the event information is sent to a session filter associated with the at least one source element.

6. The method of claim 2 wherein the session requests are received via a packet network and the system protection response is sent over a call signaling network for a circuit-switched network.

7. The method of claim 2 wherein the session requests are received via a call signaling network for a circuit-switched network and the system protection response is sent over a packet network.

8. The method of claim 1 wherein the session request is a call setup message from a circuit-switched network.

9. The method of claim 1 wherein the session request is a session initiation protocol INVITE message from a session initiation protocol network.

10. The method of claim 1 wherein the event information is received from the protected element.

11. The method of claim 1 wherein the event information is received from an entity other than the protected element.

12. The method of claim 1 wherein the event information is indicative of an overload condition for the protected element.

13. The method of claim 1 wherein the event information is indicative of a network failure affecting the protected element.

14. The method of claim 1 wherein the event information is indicative of a malicious session request attack for the protected element.

15. The method of claim 1 wherein the event information further provides information to assist in determining the select session requests.

16. The method of claim 1 wherein the event information provides information identifying the at least one source element from which the session requests are filtered.

17. The method of claim 1 wherein the event information further provides information in the group consisting of:
   a) information indicative of a number of the session requests that can be forwarded to the protected element;
   b) information indicative of a desired reduction in the session requests forwarded to the protected element; and
   c) information indicative of a number of sessions capable of being supported by the protected element.

18. The method of claim 1 wherein for certain event information all session requests for the protected element are blocked.

19. A session filter for providing session control for an element comprising:
   a) at least one interface; and
   b) a control system associated with the at least one interface and adapted to:
      i) receive session requests for establishing a session between a protected element and at least one source element;
      ii) receive event information indicative of an undesirable condition associated with the protected element;
      iii) process the event information to determine select ones of the session requests to forward to the protected element; and
      iv) send the select session requests to the protected element,
   wherein incoming session requests are selectively forwarded to the protected element upon receipt of the event information.

20. The session filter of claim 19 wherein the control system is further adapted to send a system protection response configured to stop or reduce a number of the session requests from being generated by the at least one source element.

21. The session filter of claim 20 wherein the system protection response is sent to the at least one source element.

22. The session filter of claim 20 wherein the system protection response is sent to a session filter associated with the at least one source element.

23. The session filter of claim 20 wherein the event information is sent to a session filter associated with the at least one source element.

24. The session filter of claim 20 wherein the session requests are received via a packet network and the system protection response is sent over a call signaling network for a circuit-switched network.

25. The session filter of claim 20 wherein the session requests are received via a call signaling network for a circuit-switched network and the system protection response is sent over a packet network.

26. The session filter of claim 19 wherein the session request is a call setup message from a circuit-switched network.

27. The session filter of claim 19 wherein the session request is a session initiation protocol INVITE message from a session initiation protocol network.

28. The session filter of claim 19 wherein the event information is received from the protected element.

29. The session filter of claim 19 wherein the event information is received from an entity other than the protected element.

30. The session filter of claim 19 wherein the event information is indicative of an overload condition for the protected element.

31. The session filter of claim 19 wherein the event information is indicative of a network failure affecting the protected element.

32. The session filter of claim 19 wherein the event information is indicative of a malicious session request attack for the protected element.

33. The session filter of claim 19 wherein the event information further provides information to assist in determining the select session requests.

34. The session filter of claim 19 wherein the event information provides information identifying the at least one source element from which the session requests are filtered.

35. The session filter of claim 19 wherein the event information further provides information in the group consisting of:
- a) information indicative of a number of the session requests that can be forwarded to the protected element;
- b) information indicative of a desired reduction in the session requests forwarded to the protected element; and
- c) information indicative of a number of session requests capable of being supported by the protected element.

36. The session filter of claim 19 wherein for certain event information all session requests intended for the protected element are blocked.

37. A method of operating a session filter device to provide session control for an element comprising:
- a) receiving session requests for establishing a session between a protected element and at least one source element;
- b) receiving event information indicative of an undesirable condition associated with the protected element;
- c) processing the event information to determine select ones of the session requests; and
- d) sending a system protection response configured to stop or reduce a number of the session requests from being generated by the at least one source element.

38. The method of claim 37 further comprising sending the select session requests to the protected element wherein incoming session requests are selectively forwarded to the protected element upon receipt of the event information.

39. A session filter for providing session control for an element comprising:
- a) at least one interface; and
- b) a control system associated with the at least one interface and adapted to:
  - i) receive session requests for establishing a session between a protected element and at least one source element;
  - ii) receive event information indicative of an undesirable condition associated with the protected element;
  - iii) process the event information to determine select ones of the session requests; and
  - iv) send a system protection response configured to stop or reduce a number of the session requests from being generated by the at least one source element.

40. The session filter of claim 39 wherein said control system is further adapted to send the select session requests to the protected element wherein incoming session requests are selectively forwarded to the protected element upon receipt of the event information.

* * * * *

UNITED STATES PATENT AND TRADEMARK OFFICE
CERTIFICATE OF CORRECTION

PATENT NO.       : 7,590,122 B2
APPLICATION NO. : 10/439531
DATED            : September 15, 2009
INVENTOR(S)      : Cristian Constantinof It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1856 days.

Signed and Sealed this

Twenty-first Day of September, 2010

David J. Kappos
*Director of the United States Patent and Trademark Office*